(12) United States Patent
Kopytjuk et al.

(10) Patent No.: US 12,498,456 B2
(45) Date of Patent: Dec. 16, 2025

(54) METHOD FOR CALIBRATING A RADAR SENSOR

(71) Applicant: Robert Bosch GmbH, Stuttgart (DE)

(72) Inventors: Marat Kopytjuk, Heilbronn (DE); Joachim Boerger, Friedrichshafen (DE); Bleard Loshaj, Nuremberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 324 days.

(21) Appl. No.: 18/303,483

(22) Filed: Apr. 19, 2023

(65) Prior Publication Data

US 2023/0341517 A1     Oct. 26, 2023

(30) Foreign Application Priority Data

Apr. 26, 2022    (DE) ...................... 10 2022 204 007.4

(51) Int. Cl.
*G01S 7/40*     (2006.01)
*G01S 13/931*   (2020.01)

(52) U.S. Cl.
CPC .......... *G01S 7/4021* (2013.01); *G01S 13/931* (2013.01)

(58) Field of Classification Search
None
See application file for complete search history.

(56) References Cited

U.S. PATENT DOCUMENTS

| | | | | |
|---|---|---|---|---|
| 3,750,170 A | * | 7/1973 | Brown ................... | G01S 13/583 73/167 |
| 5,270,720 A | * | 12/1993 | Stove ..................... | G01S 7/4004 342/174 |
| 5,977,906 A | * | 11/1999 | Ameen .................. | G01S 13/931 342/174 |
| 6,556,166 B1 | | 4/2003 | Searcy et al. | |
| 7,304,602 B2 | * | 12/2007 | Shinagawa ........... | G01S 7/4026 342/146 |
| 7,443,335 B2 | * | 10/2008 | Kai ........................ | G01S 13/931 342/147 |

(Continued)

FOREIGN PATENT DOCUMENTS

| | | |
|---|---|---|
| CN | 110850378 A | 2/2020 |
| CN | 111427019 A | 7/2020 |
| EP | 3239737 A1 | 11/2017 |

*Primary Examiner* — Bernarr E Gregory
(74) *Attorney, Agent, or Firm* — NORTON ROSE FULBRIGHT US LLP

(57) ABSTRACT

A method for calibrating alignment of a radar sensor in an installation environment. The method includes: measuring, with a velocity measuring device that is stationary relative to a global reference system, a velocity component of a reference object in a direction parallel to a reference axis of the installation environment, measuring, with the radar sensor, an angular deviation between the position of the reference object and an optical axis of the radar sensor, calculating an anticipated radial velocity of the reference object relative to the radar sensor, assuming that the optical axis of the radar sensor is parallel to the reference axis, measuring the radial velocity of the reference object with the radar sensor, and calculating a misalignment angle between the optical axis of the radar sensor and the reference axis, based on the difference between the measured and the anticipated radial velocity.

7 Claims, 1 Drawing Sheet

(56) References Cited

U.S. PATENT DOCUMENTS

| | | | | |
|---|---|---|---|---|
| 8,930,063 | B2* | 1/2015 | Gandhi | G01S 13/931 |
| | | | | 342/174 |
| 10,024,955 | B2* | 7/2018 | Song | G01S 13/931 |
| 2016/0259043 | A1* | 9/2016 | Schär | G01S 13/723 |
| 2018/0203109 | A1* | 7/2018 | Aoki | G01S 13/931 |
| 2020/0011970 | A1* | 1/2020 | Abari | G01S 13/931 |
| 2020/0326411 | A1* | 10/2020 | Zhou | G01S 13/931 |
| 2021/0341599 | A1* | 11/2021 | Rozewicz | G01S 13/931 |
| 2022/0365193 | A1* | 11/2022 | Wetoschkin | G01S 7/4026 |

* cited by examiner

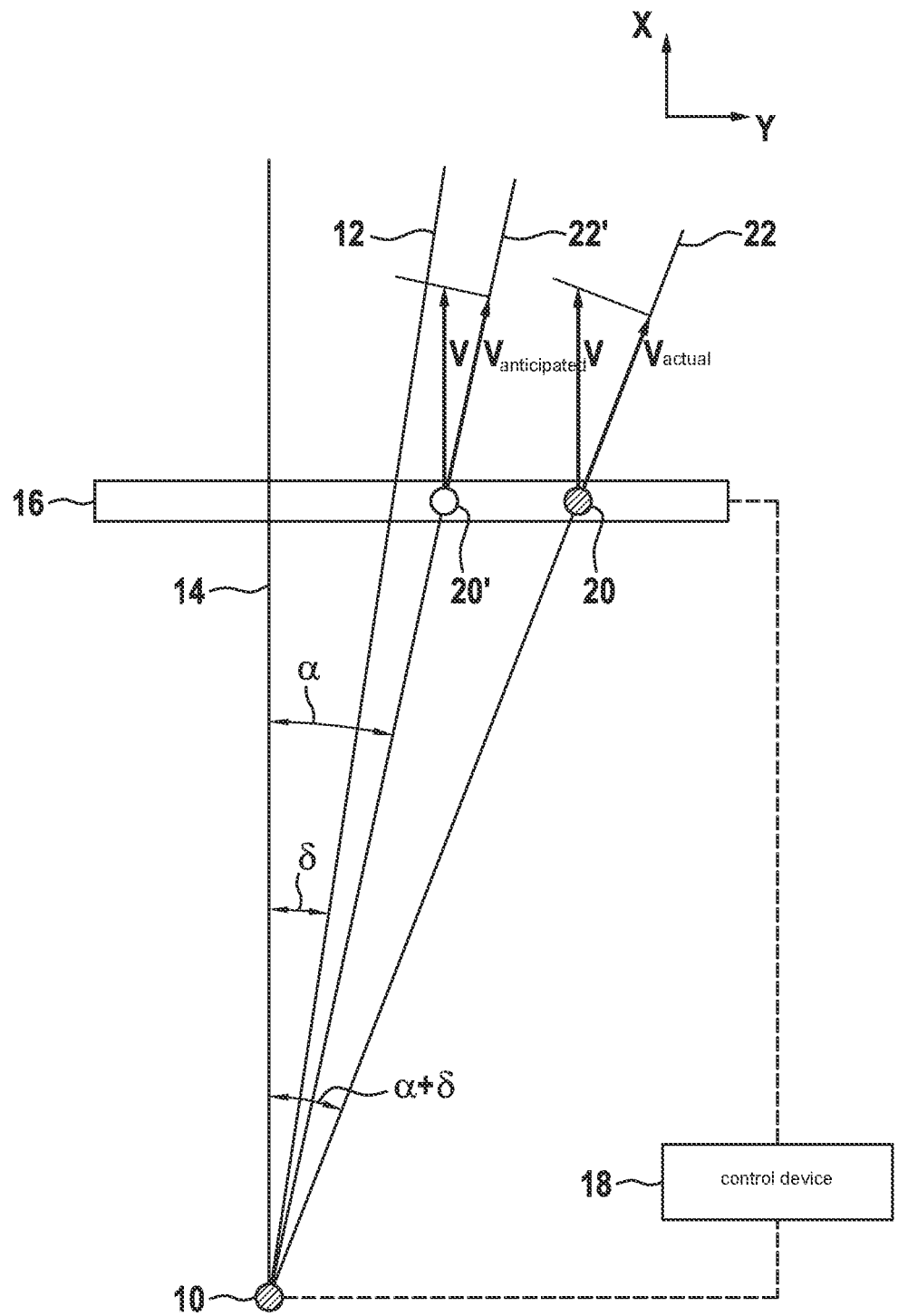

METHOD FOR CALIBRATING A RADAR SENSOR

CROSS REFERENCE

The present application claims the benefit under 35 U.S.C. § 119 of German Patent Application No. DE 10 2022 204 007.4 filed on Apr. 26, 2022, which is expressly incorporated herein by reference in its entirety.

FIELD

The present invention relates to a method for calibrating the alignment of a velocity-measuring locating system such as a radar sensor in an installation environment, in which location data for a reference object that is moving relative to a global reference system are measured by the radar sensor.

In particular, the present invention is concerned with a method for detecting and correcting an azimuth misalignment of a stationary radar sensor or of a comparable angle-resolving sensor that is capable of measuring the radial velocity of a located object.

BACKGROUND INFORMATION

Knowing the exact alignment and position of stationary radar sensors is crucial for applications in the field of infrastructure sensor systems. Over longer distances, a misalignment of just a few degrees may lead to incorrect and potentially fatal conclusions. In the context of automated driving, for example, confusion over the lane of a detected road user must be avoided at all costs. Misalignments may arise as a consequence of weather conditions, thermal expansion or external influences such as collisions, even after the initial installation and calibration of the radar sensor.

Generally speaking, in conventional methods for the angle calibration of radar sensors, stationary objects known as landmarks that are located in the field of view of the radar sensor are located by the radar sensor, and the location data are documented when the sensor is fitted. If the position or alignment of the sensor changes subsequently, this may be recognized from the fact that the distance and/or locating angle to one or more landmarks changes. By comparison with the data documented during installation and initial calibration, the misalignment may then be diagnosed, and corrected if necessary.

Various methods for the angle calibration of mobile radar sensors have become available in connection with driver assistance systems. The installation environment in this instance is the vehicle in which the radar sensor is installed.

European Patent No. EP 3 239 737 A1 describes a stochastic method for the angle calibration of a mobile radar sensor.

U.S. Pat. No. 6,556,166 B1 describes a method for the factory calibration of a radar sensor immediately after installation in a motor vehicle.

China Patent Application No. CN 110850378 A describes a method for calibrating radar sensors in intelligent transport systems (ITS) using GPS data.

China Patent Application No. CN 111427019 A describes a method of the aforementioned type in which the reference objects also include moving targets such as other vehicles, for example.

SUMMARY

An object of the present invention is to provide a method which allows for highly accurate calibration to the so-called target pose of the radar sensor, i.e., to the alignment of the radar sensor relative to a reference axis of the installation environment, as indicated in schematic diagrams.

The object may achieved in accordance with an example embodiment of the present invention by a method comprising the following steps:

measuring, with a velocity sensing device, a velocity component of the reference object relative to the global reference system in a direction parallel to a reference axis of the installation environment, measuring, with the locating system, an angular deviation between the position of the reference object and an optical axis of the radar sensor, calculating an anticipated radial velocity of the reference object relative to the locating system, assuming that the optical axis of the radar sensor forms a predefined angle with the reference axis, measuring the radial velocity of the reference object with the locating system, and calculating a misalignment angle between the optical axis of the radar sensor and the reference axis, based on the difference between the measured and the anticipated radial velocity.

The method according to the present invention requires no precise knowledge of the positions or location data of landmarks but rather is based primarily on measuring a velocity of at least one moving object. To determine the alignment of the radar sensor relative to the reference axis of the installation environment, use is made of the fact that the radial velocity of an object measured by the radar sensor using the Doppler effect is dependent on the locating angle at which the object is seen by the radar sensor. If the actual velocity of the reference object or at least the component of this velocity in the direction parallel to the reference axis is known, then a misalignment of the radar sensor may be detected from the fact that the anticipated radial velocity based on the measured velocity of the object differs from the radial velocity that is actually measured.

The misalignment angle to be calculated in accordance with the present invention is defined as the deviation of the angle between the optical axis of the locating system and the reference axis from the predefined angle that defines the target pose. In the simplest case, the target pose corresponds to an alignment of the optical axis parallel to the reference axis. In this case, the misalignment angle is simply the angle between the optical axis of the locating system and the reference axis.

The method according to the present invention disclosed herein is also particularly suitable for a simple initial calibration of a sensor immediately after installation.

Advantageous embodiments and developments of the present invention are disclosed herein.

The velocity sensing device may be a stationary velocity measuring device which is capable of measuring the velocity of the reference object in the direction parallel to the reference axis and is inexpensive to implement in the form of induction loops, light barriers or the like. If the reference objects (e.g., other vehicles) are capable of measuring their own velocity and direction of travel, the velocity sensing device may also be a receiver which receives the velocity data sent by the reference objects.

In one specific embodiment of the present invention that is easy to implement, only the velocity component of the reference object in the direction parallel to the reference axis is measured. The velocity components in the directions perpendicular thereto lead only to higher-order errors and may thus generally be disregarded, without adversely affecting the accuracy of the calibration. Optionally, however, it is also possible to measure multiple velocity components of the motion of the reference object and to carry out higher-order corrections.

Alternatively, the accuracy of the calibration may also be increased by repeating the method for a plurality of reference objects and then taking the average of the misalignments that are obtained.

The method is particularly suitable for stationary radar sensors, but may also be used in a similar manner with mobile radar sensors, provided that appropriate corrections are made for the inherent motion of the radar sensor.

The present invention also provides a measuring apparatus comprising a stationary radar sensor (or a comparable sensor), a stationary velocity sensing device that is independent of the radar sensor, and a control device, which is configured to carry out the calibration method described above.

An exemplary embodiment of the present invention is described in more detail below with reference to the FIGURES.

BRIEF DESCRIPTION OF THE DRAWING

The FIGURE is a diagram to illustrate a method for calibrating a radar sensor.

DETAILED DESCRIPTION OF EXAMPLE EMBODIMENT

The FIGURE shows a measuring apparatus comprising a stationary radar sensor 10, which is installed on a traffic island, for example, and serves to measure the distances, azimuth angles and velocities of vehicles traveling on a multilane road extending in a coordinate direction x. The radar sensor has an optical axis 12, which in the simple example considered here is likewise aligned in coordinate direction x and is thus identical to a reference axis 14 extending in direction x. Reference axis 14 thus indicates the target pose of radar sensor 10. In the example shown, however, the direction of optical axis 12 deviates from reference axis 14 by a misalignment angle $\delta$.

To enable the misalignment angle $\delta$ to be measured and corrected, the measuring apparatus additionally includes a stationary velocity measuring device 16, which may be formed by, for example, induction loops, light barriers or the like, and which extends transversely across the roadway. Velocity measuring device 16 is connected to radar sensor 10 by an electronic control device 18 to allow measurement data to be exchanged between measuring device 16 and the radar sensor. In the situation shown in the drawing, a moving reference object 20, a motor vehicle for example, is passing velocity measuring device 16 in a position which is offset from reference axis 14 in a transverse direction y perpendicular to direction x. A line of sight 22 from radar sensor to reference object 20 thus forms an azimuth angle $\alpha+\delta$ with reference axis 14. However, owing to the misalignment of radar sensor 10, the angle-resolving radar sensor measures only an azimuth angle $\alpha$, which is too small by the misalignment angle $\delta$.

Velocity measuring device 16 measures the x-component v of the velocity vector v, which indicates the velocity of reference object 20. The measured velocity value is transmitted to radar sensor 10, which at the same time measures the Doppler velocity of reference object 20. Optionally, the two measurements may also be carried out at different times, provided that a timestamp is transmitted together with the measured value from velocity measuring device 16 and that the measured Doppler velocities are recorded over time in radar sensor 10 and then the values assigned to the timestamp are read or interpolated. The Doppler velocity measured by radar sensor 10 is the radial velocity of reference object 20 in relation to radar sensor 10 and is thus equal to component $v_{actual}$ of velocity vector v in the direction of line of sight 22. For the value v of velocity vector v and the radial velocity $v_{actual}$, the following relationship thus applies:

$$v_{actual} = v \cos(\alpha+\delta). \tag{1}$$

Assuming that radar sensor 10 is correctly aligned and that the angle $\alpha$ indicates the true azimuth angle of the reference object, then the reference object would be assumed to be in a position 20' on a line of sight 22', which is rotated relative to line of sight 22 by the misalignment angle $\delta$. Based on this assumption, the anticipated value for the radial velocity would be $v_{anticipated}$, which is given by $$v_{anticipated} = v \cos(\alpha) \tag{2}$$

Solved for $\alpha+\delta$ or for $\alpha$, (1) and (2) give rise to the equations $$\alpha+\delta = \cos^{-1}(v_{actual}/v) \tag{3}$$

$$\alpha = \cos^{311}(v_{anticipated}/v) \tag{4}$$

Thus, the alignment angle $\delta$ is given by:

$$\delta = \cos^{-1}(v_{actual}/V) - \cos^{-1}(v_{anticipated}/v)$$

The misalignment angle $\delta$ may be determined in this way, so that the azimuth angles measured by radar sensor 10 for various objects may be corrected accordingly.

The calculation of the misalignment angle $\delta$ by the aforementioned method may take place either in control device 18 or directly in radar sensor 10.

If the target pose is defined in terms of the optical axis of the sensor deviating from the reference axis by a predefined angle, then the misalignment angle determined in the manner described above must also be corrected by this predefined angle.

If a plurality of objects 20 to be measured pass velocity measuring device 16 in succession, then the calibration process may be repeated for each of these reference objects. To compensate for statistical variations, it is then expedient to take an average of the misalignment angles $\delta$ obtained from the various measurements. Optionally, a moving average may be calculated on an ongoing basis, so that a possible misalignment of radar sensor 10 may be continuously checked and corrected.

If velocity vector v of reference object 20 has a component in transverse direction y, then this component provides an additional contribution to the measured Doppler velocity $v_{actual}$. The greater the true and the apparent azimuth angle $\alpha+\delta$ or $\alpha$ of the reference object, the greater this contribution. Since this contribution is not taken into consideration when calculating the anticipated Doppler velocity $v_{anticipated}$, this leads to a systematic error. It is possible to limit this systematic error, however, by only evaluating the measurement results for reference objects whose azimuth angle is below a specified threshold.

Alternatively, velocity measuring device 16 may be designed in such a way that it also measures the y-component of the velocity vector or all three components of this vector, so that the contribution of the transversal components to the anticipated Doppler velocity $v_{anticipated}$ may be calculated and taken into consideration.

What is claimed is:

1. A method for calibrating alignment of a velocity-measuring locating system in an installation environment, in which location data for a reference object that is moving relative to a global reference system are measured by the locating system, the method comprising the following steps:

measuring, with a velocity sensing device, a velocity component of the reference object relative to the global reference system in a direction parallel to a reference axis of the installation environment;

measuring, with the locating system, an angular deviation between a position of the reference object and an optical axis of the locating system;

calculating an anticipated radial velocity of the reference object relative to the locating system, assuming that the optical axis of the locating system forms a predefined angle with the reference axis;

measuring a radial velocity of the reference object with the locating system; and calculating a misalignment angle between the optical axis of the locating system and the reference axis, based on a difference between the measured and the anticipated radial velocity; and calibrating the alignment of the locating system based on the calculated misalignment angle.

2. The method as recited in claim 1, wherein the locating system includes a radar sensor.

3. The method as recited in claim 1, wherein to measure the velocity component of the reference object, a velocity measuring device is used, which includes induction loops and/or light barriers that extend in a direction transverse to the reference axis.

4. The method as recited in claim 1, wherein the method steps are repeated for a plurality of reference objects and an average is taken of the misalignment angles obtained from the various measurements.

5. The method as recited in claim 4, wherein reference objects for which the angular deviation between the position of the reference object and the optical axis is above a predefined threshold are discarded.

6. A measuring apparatus, comprising:

an angle-resolving, velocity-measuring locating system;

a stationary velocity sensing device configured to sense at least one velocity component of moving reference objects in a direction parallel to a reference axis of the measuring apparatus; and a control device configured to calibrate alignment of the locating system in an installation environment, in which location data for a reference object that is moving relative to a global reference system are measured by the locating system, the control device configured to:

measure, with the velocity sensing device, a velocity component of the reference object relative to the global reference system in a direction parallel to a reference axis of the installation environment;

measure, with the locating system, an angular deviation between a position of the reference object and an optical axis of the locating system;

calculate an anticipated radial velocity of the reference object relative to the locating system, assuming that the optical axis of the locating system forms a predefined angle with the reference axis;

measure a radial velocity of the reference object with the locating system; and calculate a misalignment angle between the optical axis of the locating system and the reference axis, based on a difference between the measured and the anticipated radial velocity; and calibrate the alignment of the locating system based on the calculated misalignment angle.

7. The measuring apparatus as recited in claim 6, wherein the locating system includes a radar sensor.

\* \* \* \* \*